United States Patent
Bell et al.

(10) Patent No.: US 6,354,465 B2
(45) Date of Patent: Mar. 12, 2002

(54) PROTABLE DEVICE FOR ACCURATELY METERING AND DELIVERING COHESIVE BULK SOLID POWDERS

(75) Inventors: Timothy Allan Bell, Wilmington, DE (US); James Todd Delfunt, Waverly, TN (US); Darryl W. Geyen, Plano, TX (US); Michael Thomas Hyzny, Kennett Square, PA (US); Barton J. Firman, Milton, PA (US); Thomas Leroy Krieger, Milton, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/681,512

(22) Filed: Apr. 19, 2001

Related U.S. Application Data

(63) Continuation of application No. 09/559,104, filed on Apr. 27, 2000, now abandoned.

(51) Int. Cl.$^7$ ................................................ B67D 5/14
(52) U.S. Cl. .................. 222/58; 222/195; 222/196; 222/504
(58) Field of Search ................ 222/1, 195–196, 222/198, 58, 504; 137/240, 897, 605; 251/144

(56) References Cited

U.S. PATENT DOCUMENTS

| | | | | |
|---|---|---|---|---|
| 941,442 A | * | 11/1909 | Dornfeld ................ 222/195 X |
| 2,305,724 A | * | 12/1942 | Luetzelschwab ............ 137/240 |
| 2,631,759 A | * | 3/1953 | Hoopes .................. 137/240 X |
| 3,029,000 A | * | 4/1962 | Kobee ........................ 222/195 |
| 3,097,828 A | * | 7/1963 | Grun ..................... 222/195 X |
| 3,305,142 A | * | 2/1967 | Caldwell ................... 222/195 |
| 3,820,697 A | | 6/1974 | Courtney ................... 222/196 |
| 3,840,155 A | * | 10/1974 | Frye et al. ................. 222/195 |
| 4,337,880 A | | 7/1982 | Rozmus ..................... 222/152 |
| 4,378,897 A | | 4/1983 | Kattelmann .................. 222/56 |
| 4,405,240 A | * | 9/1983 | Laidlaw ................. 222/195 X |
| 4,413,758 A | * | 11/1983 | Walters ..................... 222/195 |
| 4,691,843 A | | 9/1987 | Dunan ....................... 222/514 |
| 4,809,886 A | * | 3/1989 | Dirkse et al. .............. 222/195 |
| 4,941,779 A | * | 7/1990 | Dewitz et al. .......... 222/195 X |
| 5,096,096 A | * | 3/1992 | Calaunan ................ 222/195 X |
| 5,145,009 A | | 9/1992 | Mheidle et al. ............... 141/83 |

FOREIGN PATENT DOCUMENTS

| | | | |
|---|---|---|---|
| EP | 0 197 342 A1 | 3/1986 | ............ G01F/11/34 |
| EP | 0 678 736 B1 | 8/1994 | ............ G01G/13/10 |

OTHER PUBLICATIONS

Bell and Grygo, Applications of Solid Flow Testing to Portable Bin Systems, Proceedings of the second Israel Conference for Conveying and Handling Particulate Solids, Jerusalem, May, 1997, k pp. 10.8–10.13.
Geldhart, Powder Technol., 7, 285–292, 1973.
Omni Filter & Mfg., Inc., Large Fluidizing Membrane Hoppers (No Date).
Bulletin by Umformtechnik Hausach Gmbh, "Hard Flowing Bulk Materials Safe Discharge" (No Date).
Article by Rotolok Valves Inc., "Rotolok", IBC System (No Date).
Bulletin by Anag, A. Nussbaumer AG, "Bulk–Powder–Discharge" (No Date).
Bulletin by Anag, A. Nussbaumer AG, "Cone Valve IBC System" (No Date).
Bulletin by IBC Systems, Matcon IBC, Matcon–Buls (No Date).
Article on Matcon Discharger, Typical Matcon Arrangement (No Date).

* cited by examiner

Primary Examiner—Kenneth Bomberg

(57) ABSTRACT

The present invention relates to a portable device for metering and delivering a desired weight of a cohesive particulate solid material such as pigmentary titanium dioxide.

11 Claims, 2 Drawing Sheets

PROTABLE DEVICE FOR ACCURATELY METERING AND DELIVERING COHESIVE BULK SOLID POWDERS

This Application is a continuation of application Ser. No. 09/559,104 filed Apr. 27, 2000, now abandoned.

BACKGROUND OF INVENTION

The present invention relates to a portable device (a bin system) for metering and delivering a desired weight of a cohesive particulate solid material such as pigmentary titanium dioxide.

Solid, powder materials are generally delivered to an industrial user as large bulk volumes such as hopper cars or truck, as shipments of large single bags containing a ton or metric ton of material, or as pallets of individual bags, each weighing 50 pounds or more.

Often times in an industrial process, the manufacturer may need to add a small amount of solid powder to make or top off a batch of product. The weight needed may be too small to be conveniently delivered from a large bulk storage device or an amount that is not a convenient multiple of a small package of material, for example, a 50-pound bag.

Although prior art describes various schemes or devices for small bulk delivery of powders, no system has provided the accuracy or complete discharge of cohesive powders necessary to industrial processes.

U.S. Pat. No. 3,820,697 teaches a valve system for controlling the flow of fluids or easy-to-flow granules from a storage hopper. This valve system appears to be prone to possible jamming or leakage and contamination of the powder by the fluids actuating the valve.

U.S. Pat. No. 4,691,843 teaches a valve assembly which may be used on fixed or portable storage bins to discharge bulk solid materials, but this system has proved inadequate in the delivery of cohesive powders such as titanium dioxide as reported in the article by Bell and Grygo, Applications of Solid Flow Testing to Portable Bin Systems, published in the Proceedings of the Second Israel Conference for Conveying and Handling Particulate Solids, Jerusalem, May, 1997, pages 10.8 to 10.13.

Other patents relate to solids delivery systems are U.S. Pat. Nos. 4,378,897; 4,337,880; European Patent Application 0 197 342; U.S. Pat. No. 5,145,009 and European Patent EP 0 678 736 B1, but none of these teach or suggest a delivery or metering system for cohesive powders.

BRIEF SUMMARY OF THE INVENTION

The present invention is a portable device (bin system) for delivery and metering of bulk cohesive powders comprising: (a) a hopper supported on a frame, wherein the hopper has an opening into which the bulk powder is charged formed by vertical walls and a section of generally converging walls connecting the vertical wall to an opening through which material is discharged wherein at least the portion of the hopper having converging walls is lined with a pneumatic fluidizing membrane; (b) a flow control mechanism; (c) a means of measuring and controlling the weight of material discharged; (d) a control loop to close the flow control mechanism when the desired weight has been discharged from the hopper; and (e) means to render the device portable; wherein the flow control mechanism is a valve assembly comprising a piston valve having a cone shaped closure member, a body comprising a cylinder of which the interior walls are lined with a pneumatic fluidizing membrane, an automatic means by which the valve is moved downward and upward between the open and closed positions and is optionally oscillated at selected amplitudes and frequencies about the opened position and a ring forming a valve seat wherein the ring has slots through which a flow of gas is directed.

The preferred automatic means by which the valve is moved downwards and upwards and optionally vibrated is a gas pressure regulated and controlled pneumatic controller.

The preferred means for metering the weight of material discharged are load cells positioned between the hopper and support frame.

To provide convenient delivery to a specific location, the device of the present invention may further comprise a discharge chute positioned below the flow control mechanism to direct the material discharged. With very cohesive powders, it is preferred that the discharge chute be lined at least on the lower inside surface with a pneumatic fluidizing membrane.

To reduce dusting, the device of the present invention may be fitted with a top-cover placed over the opening of the hopper wherein the top-cover is formed from a structural material or from fabric. Additionally, the device may be fitted with a paddle positioned on the valve closure member and extending into the hopper to aid in breaking up lumps of the powder.

The device of the present invention includes as a part of the device a means to render the device portable such as wheels or pockets to receive forklift arms.

The present invention also includes a method for adding a predetermined amount of a cohesive powder to an in-process product batch comprising discharging the cohesive particulate solid material from a bulk storage device into equipment processing the product batch wherein the bulk storage device comprises: (a) a hopper supported on a frame, wherein the hopper has an opening into which the bulk powder is charged formed by vertical walls and a section of generally converging walls connecting the vertical wall to an opening through which material is discharged wherein at least the portion of the hopper having converging walls is lined with a pneumatic fluidizing membrane; (b) a flow control mechanism; (c) a means of measuring and controlling the weight of material discharged; (d) a control loop to close the flow control mechanism when the desired weight has been discharged from the hopper; and (e) means to render the device portable; wherein the flow control mechanism is a valve assembly comprising a piston valve having a cone shaped closure member, a body comprising a cylinder of which the interior walls are lined with a pneumatic fluidizing membrane, an automatic means by which the valve is moved downward and upward between the open and closed positions and is optionally oscillated at selected amplitudes and frequencies about the opened position and a ring forming a valve seat wherein the ring has slots through which a flow of gas is directed.

The present invention also includes a valve assembly comprising a piston valve having a cone shaped closure member, a body comprising a cylinder of which the interior walls are lined with a pneumatic fluidizing membrane, an automatic means by which the valve is moved downward and upward between the open and closed positions and is optionally oscillated at selected amplitudes and frequencies about the opened position and a ring forming a valve seat wherein the ring has slots through which a flow of gas is directed.

DETAILED DESCRIPTION OF THE INVENTION

Figure 1:
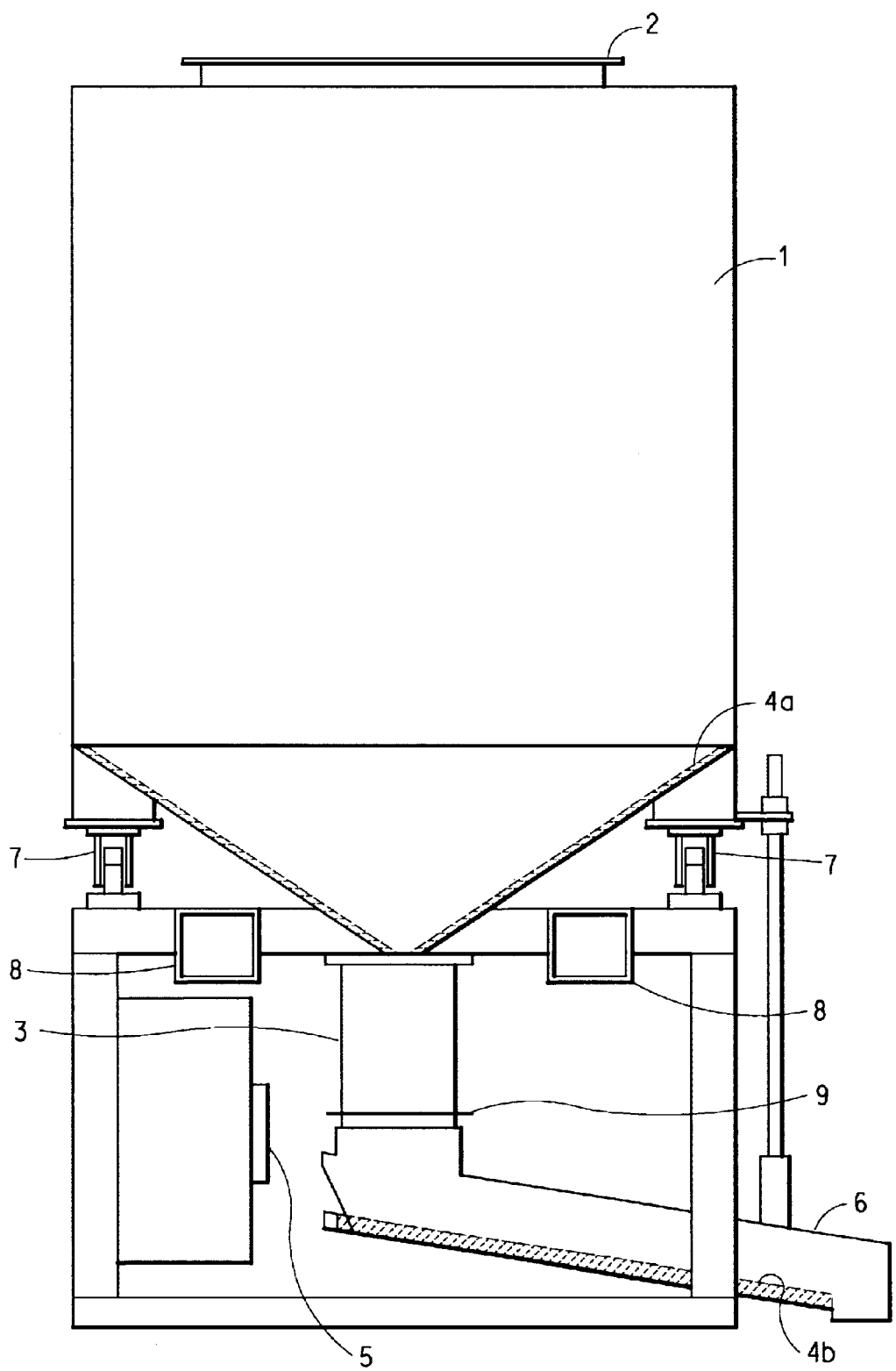
FIG. 1 shows cut away view of a portable bin system according to the present invention.

The present invention provides a portable device for accurately metering, and delivering, at a controllable rate, a predetermined weight of a cohesive powder.

As used herein, the terms moved upwards and downwards in reference to the control valve of the present invention includes the rapid movement such as vibration or oscillation.

Particles with an average size less than about 0.15 mm are frequently difficult to handle in large volume and are generally referred to as powders. Examples of powders include pigments, powdered carbon black, white wheat flour and confectioner's sugar. Most powders are cohesive and will not flow readily through small hopper outlets and valves.

The minimum size of outlet necessary for reliable gravity discharge of cohesive powders from a hopper having converging walls will frequently exceed 150 mm. Valves used to control the flow of cohesive powders must usually be as large as the required outlet size (150 mm or more). Such valves, when open, may deliver powders at high rates, but smaller valves (or partially open large valves) will not deliver any powder at all. High discharge rates from large diameter valves are not easy to control since it is not possible to open and close the large valves fast enough to provide precision metering.

In addition to the issue of valve size, many cohesive powders exhibit high friction against the walls of the hopper, causing a flow pattern (known as funnel flow) in which the powder preferentially flows down the center of the hopper to the outlet. Such flow patterns lead to flow obstructions known as ratholing, in which the powder drains from the center of the hopper but remains in a cohesive mass near the walls. When viewed from above, such a condition resembles a vertical tunnel through the powder. When such flow patterns exist, much of the hopper contents may remain in place. Even a relatively large outlet at the bottom of the hopper may not cause the powder to fall away from the walls.

The behavior of particle systems interacting with a gas stream is often described using a criterion developed by Geldart (Powder Technol. 7, 285-292, 1973). In Geldart's criterion, particle assemblages are described by their mean diameter and particle density. Geldart characterizes four categories, identified as A, B, C and D. The larger, denser particles, such as grains of rice, dry sand and table salt (average size larger than 0.150 mm), fall into Geldart's categories B and D. Such materials can be easily delivered and metered by a variety of means. Smaller, lighter particles will fall into categories C and A. Particle systems with mean particle diameters less than approximately 0.020 mm generally are considered to be category C (or Cohesive), regardless of their density. Essentially all pigments fall into this category. Particle systems with mean diameters between 0.020 mm and 0.150 mm may be category C or category A (Aeratable) depending on their density and other factors influencing interparticle forces and interactions with gas streams. Particle systems that are aeratable can sometimes be fluidized with a counter-current gas flow, and can be delivered and metered in a fluid-like state. However, the gas flow rates required for fluidization can be significant, leading to dusting problems with both the hopper and downstream equipment. In addition only a small proportion of powders of industrial interest are actually aeratable.

Many powders used in industry, particularly pigment particles, are Type C particles (1) requiring large valve and discharge openings, (2) displaying high discharge rates, if they will discharge at all and (3) being characterized by high wall friction and ratholing.

The present invention may be used to deliver and meter both aeratable and cohesive powders as defined by Geldart. The term cohesive powders as used herein means particles characterized as Geldart Type A and C particles.

Prior art metering and delivery systems required the addition of noisy or heavy vibrators or mechanical stirrers to force the powder toward the outlet. Such vibrators and stirrers make accurate weight delivery impossible.

The inventors in the present invention wanted to provide a device that would accurately meter and deliver cohesive powders such as titanium dioxide pigment powder without the disruption in material flow that characterizes such strongly cohesive powders. They also wanted a device that would be compact enough to be easily portable so that it could be moved from one location to another in a manufacturing plant. To be fully functional, the inventors wanted a device that required only a minimum amount of auxiliary services such as electric and air service, two services commonly available at manufacturing locations.

The present invention combines a hopper having vertical walls and a conical shaped lower section and a pneumatic membrane with a support frame adapted to be portable, a novel valve system, a weight monitoring system and a control loop. This combination, referred to herein as the bin system of the present invention, results in a portable device that may be designed to be compact, contain one metric ton of material which can be metered and delivered with an accuracy of about ±5 pounds for a system containing one metric ton. This device may be fully self-contained requiring only air and electrical services. Electrical service may be provided by a variety of means including a battery that could be mounted on the bin system. The size and weight of this particular design (the hopper, one metric ton in capacity, may be from about 50 to 70 inches high having a cone angle of from about 30 to 45 degrees) can be easily moved from location to location, even when fully loaded, by a 4000 pound capacity fork lift or other equipment commonly available at manufacturing locations.

FIG. 1 shows a portable bin system according to the present invention with a hopper 1 and a removable top cover 2. The pneumatic fluidizing membrane serves as a lining in selected parts of the bin. The preferred placement of the pneumatic fluidizing membrane is in the regions of the bin as indicated by short dashed lines in FIG. 1. At 4a, the membrane lines the conical portion of the hopper, and at 4b, the membrane lines the lower surface of the discharge chute 6. The pneumatic fluidizing membrane provides a means to promote powder flow along the walls toward the outlet for complete emptying of the hopper without the use of vibrators or stirrers. This is of particular importance for finely divided pigment powders.

The pneumatic membrane does not fluidize the mass of the bulk material, but serves to loosen the bulk material and reduce its attraction to, or friction against, the walls of the hopper. For strongly cohesive powders such as titanium dioxide, the pneumatic membrane may be used to line the control valve body (the hatched region indicated by 4c of FIG. 2) and at least one internal surface of a delivery chute or slide (6 of FIG. 1).

Other features of the preferred embodiment of the present invention shown in FIG. 1 are load cells at 7, pockets for forklift arms at 8 and a flexible connection for the chute at 9.

As used herein, the term pneumatic fluidizing membrane means a porous surface through which air or some other suitable gas is fed. The membrane contains a multitude of small holes, less than 0.030 mm in diameter, spaced closely together. The pathway by which the gas passes through the membrane is tortuous, resulting in a measurable resistance to the flow of gas. Membranes can be formed from cloth felt, polymers, sintered metal, or metal laminates. Such membranes are available from Young Industries of Muncy, Pa.

Pneumatic membranes may be selected to meet requirements of specified powders. For example, membranes with larger holes or less tortuous gas flow paths may not be effective with many forms of powders. The gas flow rate through the membrane does not have to be sufficient to fluidize the entire hopper contents. Gas flow rates may be adjusted for the powder that is to be metered and delivered by the bin system.

Figure 2:
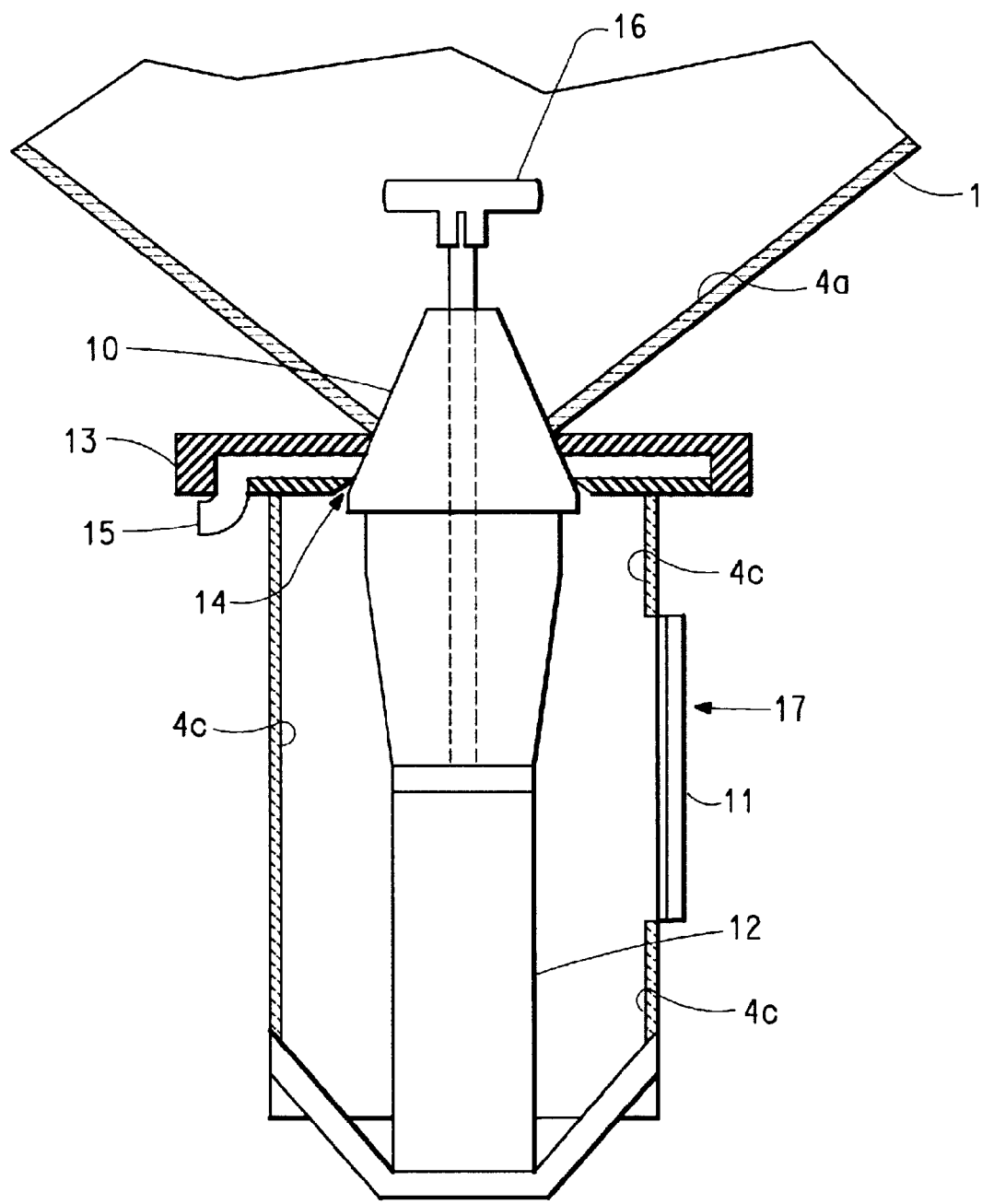
FIG. 2 shows a flow control valve according the present invention.

A flow control mechanism as used herein means a device to start and stop the flow of the powder from the hopper into a delivery chute or slide. In FIG. 1, the placement of the flow control mechanism is indicated at 3. A flow control mechanism of the present invention is illustrated in FIG. 2.

Material may be discharged directly from the hopper without using a chute or slide by placing the bin system so that the hopper discharge opening is over the opening of a receiving device such as a tank, vessel, feed device, or kettle.

The preferred flow control mechanism is a valve as described below.

A means for measuring and controlling weight of the material discharged as used herein is a means to monitor the weight of the hopper and the powder to be delivered as the powder is discharged. The weight delivered is determined by difference. Load cells are the preferred means for measuring and controlling the weight of material discharged. Such load cells are shown as 7 of FIG. 1. When load cells are used, the hopper is positioned over the load cells. Load cells are preferred because their position under the hopper results in a compact bin system. The hopper of the present invention could also be suspended from a support frame, and the means of measuring and controlling weight of the material discharged could be positioned above the hopper.

The essential features for a mechanism that monitors the weight of the hopper plus the powder load are 1) the mechanism monitor the weight continuously or at intervals that are for practical purposes continuous, and 2) the mechanism can be coupled with, or have incorporated into it, a controller. The controller (shown at 5 in FIG. 1) is an interface between the bin system operator, the flow control mechanism or control valve, and air service. Using the controller, the bin system operator may enter a set point or a desired weight of powder to be delivered and initiate the discharge. The controller may automatically stop the discharge when the desired weight of powder has been delivered. Although the bin system may be operated automatically or manually, automatic operation is recommended for accurate and precise powder delivery.

The controller, coupled with air service, the means of monitoring the weight of the hopper and powder load, and the flow control mechanism make up the control loop. The controller may also control the flow of air to various portions of the pneumatic fluidizing membrane located in the bin system as well as operate the control valve or a flow control mechanism. Locations of various air service ports on the bin system is not critical. The assembly of air valves regulating the air flow to the pneumatic membranes located through the bin system may be operated independently by the controller to achieve desired accuracy in the delivery of the powder. The control loop may contain numerous solenoids that open and close various air valves providing air to the flow control mechanism or the pneumatic membrane. The control loop receives input signals from the weight monitoring mechanism to start or stop the discharge of the powder by opening or closing the flow control mechanism. Components of such a control loop are well known in the art.

The unique aspects of the present invention result from the combination of a control loop with the pneumatic membrane and the flow control mechanism. This combination accurately discharges and delivers cohesive powders such as titanium dioxide pigment within ±5 pounds or less for a system containing one metric ton.

Means to render the device portable as used herein includes fork lift arm pockets (8 of FIG. 1), preferably located on the support frame, wheels, skids and suspension systems to support the bin system so that it can be moved along an overhead track.

Air service means the use of air or an inert gas to activate the pneumatic membrane and for use in the flow control mechanism. The term air as used herein includes air other inert gases suitable for use in the operation of the present invention.

FIG. 2 shows a preferred flow control mechanism of the present invention. The placement of the control mechanism in the bin system is indicated at 3 in FIG. 1.

In FIG. 2, the flow control mechanism is a valve assembly having a cone shaped closure member 10 and a valve body 11, of which a portion is lined with pneumatic membrane 4c and a stem 12. If desired the valve body may have a service door, 17.

For precise metering of the powder, the valve is opened and closed automatically from a signal generated by the controller. The cone moves down to the open position and powder flows downward through the annular space. Powder may be directly discharged from the opening at the base of the valve body, or discharged through a delivery chute or slide (6 of FIG. 1) joined to the system at the base of the flow control mechanism. In this way the flow of the powder may be directed to a specific delivery point. The cone shaped closure member, when closed, is seated against a ring 13 that forms the valve seat. This ring is slotted at 14, shown in FIG. 2 as a beveled edge that forms a gap through which air flows when the valve is in the open position. Air service is provided through port 15; when the valve is opened, the gap at 14 forms an air lance. This flow of air or lance keeps the region at the top of the valve body between the valve seat and the valve cone 10 from becoming clogged with a build-up of the cohesive powder.

For strongly cohesive powders such as an untreated titanium dioxide pigment, for example a plastics grade product, a paddle or lump breaker 16 may be fixed atop of and attached to the cone shaped closure member. In addition to moving to an opened or closed position, the valve stem with the cone shaped closure member may be automatically oscillated about the open position without closing the valve. The oscillations of the valve stem up and down move the paddle or lump breaker up and down to break up lumps of powder for a smooth, fluid-like flow into and through the valve body. The oscillations may be made at selected amplitudes and frequencies about the opened position and may be selected to optimize the flow of a particular powder.

The preferred automatic means by which the valve is moved downwards and upwards and optionally vibrated is a gas pressure regulated and controlled by pneumatic controller. Such pneumatic controllers comprise air valves and solenoids.

A delivery chute or slide may be used to direct the discharge. When such a chute or slide is used with a strongly cohesive powder all interior surfaces of the chute or slide may be lined with the pneumatic membrane. It is recommended that at least the bottom or lower surface of the chute is lined with the pneumatic membrane.

Typically the bin system of the present invention shown in FIG. 1 would function as follows. The hopper could be filled from a bulk storage or by dumping metric ton or so-called big bags of material into the hopper. An operator would move the bin system to the desired location in the plant for discharging the desired weight of powder. The bin system may be positioned directly over the receiving vessel so that the discharged powder falls from the base of the valve body into the vessel, or the bin may be fitted with a discharge chute or slide to direct the flow of the powder discharged to a desired location.

Once the bin system is positioned and connected to electric and air services, the operator can enter the desired discharge weight into the controller and initiate the discharge operation either directly or via a remote device that is hard wired to or communicates with the controller. The powder is automatically discharged from the hopper until the weight desired is delivered and the controller automatically closes the flow control valve.

The bin system may have a top cover to prevent dusting and to protect the contents of the hopper. To promote discharge, the cover may be vented, the hopper may be vented or the cover may be formed from a fabric. Vents may be connected to a dust collection system or other equipment to collect or recycle the powder. The bin provides a fluid-like and continuous flow for even strongly cohesive powders.

What is claimed is:

1. A portable device for delivery and metering of cohesive powders comprising:
   (a) a hopper supported on a frame, wherein the hopper has an opening into which the cohesive powder is charged formed by vertical walls and a section of generally converging walls connecting the vertical wall to an opening through which material is discharged wherein at least the portion of the hopper having converging walls is lined with a pneumatic fluidizing membrane;
   (b) a flow control mechanism;
   (c) a means of measuring and controlling the weight of material discharged;
   (d) a control loop to close the flow control mechanism when the desired weight has been discharged from the hopper; and
   (e) means to render the device portable;
   wherein the flow control mechanism is a valve assembly comprising a piston valve having a cone shaped closure member, a body comprising a cylinder of which the interior walls are lined with a pneumatic fluidizing membrane, an automatic means by which the valve is moved downward and upward between the open and closed positions and is oscillated at selected amplitudes and frequencies about the opened position and a ring forming a valve seat wherein the ring has slots through which a flow of gas is directed.

2. The device of claim 1 wherein the automatic means by which the valve is moved downwards and upwards or vibrated is a gas pressure regulated and controlled pneumatic controller.

3. The device of claim 1 wherein the means of measuring the weight of material discharged comprises load cells positioned between the hopper and support frame.

4. The device of claim 1 further comprising a discharge chute to direct the material discharged.

5. The device of claim 4 where the discharge chute is lined at least on the lower inside surface with a pneumatic fluidizing membrane.

6. The device of claim 1 further comprising a top-cover placed over the opening of the hopper wherein the top-cover is formed from a structural material.

7. The device of claim 1 further comprising a paddle positioned on the valve closure member and extending into the hopper.

8. The device of claim 1 wherein the means to render the device portable are wheels or pockets to receive forklift arms.

9. A valve assembly comprising a piston valve having a cone shaped closure member, a body comprising a cylinder of which the interior walls are lined with a pneumatic fluidizing membrane, an automatic means by which the valve is moved downward and upward between the open and closed positions and is oscillated at selected amplitudes and frequencies about the opened position and a ring forming a valve seat wherein the ring has slots through which a flow of gas is directed.

10. A portable device for delivery and metering of cohesive powders comprising:
   (a) a hopper supported on a frame, wherein the hopper has an opening into which the cohesive powder is charged formed by vertical walls and a section of generally converging walls connecting the vertical wall to an opening through which material is discharged wherein at least the portion of the hopper having converging walls is lined with a pneumatic fluidizing membrane;
   (b) a flow control mechanism;
   (c) a means of measuring and controlling the weight of material discharged;
   (d) a control loop to close the flow control mechanism when the desired weight has been discharged from the hopper; and
   (e) means to render the device portable;
   wherein the flow control mechanism is a valve assembly comprising a piston valve having a cone shaped closure member, a body comprising a cylinder of which the interior walls are lined with a pneumatic fluidizing membrane, an automatic means by which the valve is moved downward and upward between the open and closed positions and a ring forming a valve seat wherein the ring has slots through which a flow of gas is directed.

11. A valve assembly comprising a piston valve having a cone shaped closure member, a body comprising a cylinder of which the interior walls are lined with a pneumatic fluidizing membrane, an automatic means by which the valve is moved downward and upward between the open and closed positions and a ring forming a valve seat wherein the ring has slots through which a flow of gas is directed.

* * * * *

UNITED STATES PATENT AND TRADEMARK OFFICE
CERTIFICATE OF CORRECTION

PATENT NO.    : 6,354,465 B2
DATED         : March 12, 2002
INVENTOR(S)   : Timothy Allan Bell, James Todd Delfunt, Darryl W. Geyen, Michael Thomas Hyzny, Barton J. Firman and Thomas Leroy Krieger It is certified that error appears in the above-identified patent and that said Letters Patent is hereby corrected as shown below:

<u>Title page,</u>
Item [54], Title, "PROTABLE DEVICE FOR ACCURATELY METERING AND DELIVERING COHESIVE BULK SOLID POWDERS" should read
-- PORTABLE DEVICE FOR ACCURATELY METERING AND DELIVERING COHESIVE BULK SOLID POWDERS --

Item [75], Inventor "Thomas Leroy Krieger, Milton, PA," should read
-- Thomas Leroy Krieger, Wilmington, DE. --

Signed and Sealed this

Tenth Day of September, 2002

Attest:

Attesting Officer

JAMES E. ROGAN
*Director of the United States Patent and Trademark Office*